United States Patent
Zoe

(10) Patent No.: US 11,549,625 B2
(45) Date of Patent: Jan. 10, 2023

(54) MAGNETIC HOSE CONNECTOR AND INTEGRATED MAGNETIC CONNECTORS

(71) Applicant: Thais Zoe, Scottsdale, AZ (US)

(72) Inventor: Thais Zoe, Scottsdale, AZ (US)

(*) Notice: Subject to any disclaimer, the term of this patent is extended or adjusted under 35 U.S.C. 154(b) by 0 days.

(21) Appl. No.: 16/894,853

(22) Filed: Jun. 7, 2020

(65) Prior Publication Data
US 2020/0386354 A1 Dec. 10, 2020

Related U.S. Application Data

(60) Provisional application No. 62/859,058, filed on Jun. 8, 2019.

(51) Int. Cl.
| | |
|---|---|
| *F16L 37/00* | (2006.01) |
| *F16G 15/04* | (2006.01) |
| *F16G 11/10* | (2006.01) |
| *F16L 15/00* | (2006.01) |
| *F16L 37/12* | (2006.01) |

(52) U.S. Cl.
CPC ............ *F16L 37/004* (2013.01); *F16G 11/10* (2013.01); *F16G 15/04* (2013.01); *F16L 15/006* (2013.01); *F16L 37/12* (2013.01)

(58) Field of Classification Search
CPC ....... F16L 37/004; F16L 15/006; F16L 37/12; A42B 3/328; A42B 3/228; A42B 3/281; A42B 3/286
See application file for complete search history.

(56) References Cited

U.S. PATENT DOCUMENTS

| | | | | |
|---|---|---|---|---|
| 2,912,263 | A * | 11/1959 | Christy | F16L 37/004 285/371 |
| 3,181,895 | A * | 5/1965 | Cator | F16L 37/004 285/1 |
| 3,844,597 | A * | 10/1974 | Elrod | B65D 55/12 292/251.5 |
| 7,793,987 | B1 * | 9/2010 | Busch | F16L 37/004 285/9.1 |
| 2004/0026933 | A1 * | 2/2004 | Smith | E05C 19/166 292/251.5 |
| 2005/0052018 | A1 * | 3/2005 | Pichotta | F16L 25/0018 285/9.1 |

(Continued)

*Primary Examiner* — Zachary T Dragicevich
*Assistant Examiner* — James A Linford
(74) *Attorney, Agent, or Firm* — Cygnet IP Law; Stephen W. Aycock, II

(57) ABSTRACT

A hose connector is disclosed that provides a magnetized connection of hoses, tubes, cables, ducts, pipes, chains, straps, wires, twine, cord and/or rope creating a continuation in length for versatile and extended flow for, but not limited to, watering needs eliminating conventional connector threads currently requiring multiple turns to release or attach or existing pronged coupling requiring a degree of hand agility and strength. Thereby the disclosed matter provides the means for a fast, single motion attachment or twisting detachment of, but not limited to hose, tube, cable, duct, pipe, chain, strap, wire, twine, cord and/or rope ends without requiring the hand strength or precision that some conventional hose, tube, cable, duct, twine, cord, and/or rope connectors may require. There may be any combination of connecting the ends of hoses, tubes, cables, ducts, pipes, chains, straps, wires, twines, cords, and/or ropes. In some scenarios, flow is not required.

16 Claims, 4 Drawing Sheets

(56) References Cited

U.S. PATENT DOCUMENTS

| | | | | |
|---|---|---|---|---|
| 2006/0175842 A1* | 8/2006 | Saitoh | ................... | E05C 19/163 |
| | | | | 292/251.5 |
| 2009/0293238 A1* | 12/2009 | Davis | ................... | F16L 37/004 |
| | | | | 24/303 |
| 2011/0084474 A1* | 4/2011 | Paden | ................... | F16L 37/004 |
| | | | | 285/9.1 |
| 2018/0195654 A1* | 7/2018 | Jaeger | ................. | A42B 3/0406 |

* cited by examiner

MAGNETIC HOSE CONNECTOR AND INTEGRATED MAGNETIC CONNECTORS

RELATED APPLICATIONS

This application claims the benefit of U.S. Application No. 62/859,058, filed on Jun. 8, 2019, and entitled "Hose Connector," which is incorporated herein by reference in its entirety.

FIELD

This application relates generally to connectors with magnetic connection elements, and, more particularly, to hoses, tubes, cables, ducts, pipes, chains, straps, wires, twine, cord, and/or rope, and the like with magnetic connection elements.

BACKGROUND

When connecting some conventional hoses, tubes, cables, ducts, pipes, chains, straps, wires, twines, cords, ropes, or the like it is often useful to join the end of any combination of the above to an end attachment or a source of fluid and/or to extend the length and reach. Some conventional hoses, and/or tubes, often present difficulty when attempting to establish a solid connection and/or a fluid-tight seal through twisting existing threaded or pronged hose and tube connectors. This may be difficult for some people lacking hand strength, wearing gloves, or with gripping limitations such as arthritis. A need exists to connect hoses, tubes, cables, ducts, pipes, chains, straps, wires, twines, cords and/or rope, etc. . . . with less effort and more ease.

Thus, there may be a need in the conventional art for, including but not limited to a hose, tube, cable, duct, pipe, chain, straps, wires, twine, cord and/or rope connector that may be easier to operate even while wearing gloves, or with limited dexterity or hand strength, to provide an effective, fast, efficient, safe, simple, easy-to-use, time saving, experience. The disclosed subject matter was conceived in light of the above-mentioned problems and/or limitations.

SUMMARY

The disclosed subject matter provides improved means to connect any combination of, including, but not limited to, two hose, tube, cable, duct, pipe, chain, strap, wire, twine, cord, and/or rope ends. When in use, an implementation can provide for a variety of hoses, tubes, cables, ducts, pipes, chains, straps, wires, twines, cords, and/or ropes to be quickly and easily connected, lengthened or disconnected, with the hoses or tubes accommodating a wide range of fluid flow, including, but not limited to, transfusion, anesthesia, irrigation, flushing, heating, cooling, circulation and/or watering purposes, etc. Some implementations can include a solid construction with no flow in part or entirety.

Additionally, some implementations can permit use while wearing gloves, having below average dexterity, or hand strength, to help preventing injury, frustration, leaks and to permit completion of chores or the task at hand without assistance or delays. Furthermore, weather, and environmental effects can be reduced by eliminating the threading and metal exterior which often jams in extreme temperatures or in the presence of grit or debris that can accumulate in crevices.

Some implementations of the disclosed subject matter can include a hose connector in the form of a male and female coupler, each having a magnetic component, for use in activities including, but not limited to, gardening, cooking, irrigation, crafts, medical, farming, agricultural, firefighting, construction, nautical, building maintenance or repair, and/or automotive work. Some implementations can provide for a connection and/or extension for coupling one hose to another with reduced effort compared to some conventional hose connection devices. Also, some implementations can be released more easily and, and if desired, connectors can be used to extend hoses, tubes, cables, ducts, pipes, chains, straps, wires, twines, cords and/or ropes to any suitable length. Thereby, providing ease of use in the workspace and at home to better complete the task at hand while preventing frustration, pain, and delays.

Some implementations can include a connector that is magnetized and may be easily slid in place for a primary and secure connection with a simple twist releasing the embedded or otherwise attached magnets for disconnection. Thus, providing the operators, even while wearing gloves, or with limited dexterity or hand strength, an effective, safe, simple, easy-to-use, time saving, experience when using the hose connector.

The hose, tube, cable, duct, pipe, chain, straps, wires, twine, cord and/or rope connectors are devices that can include, but are not limited to a magnetic material (e.g., an alloy) encased in a protective coating and embedded, or otherwise attached, in rubber and/or a housing made of plastic, alloy or other suitable material to create a secure connection and comfortable grip.

In some implementations, magnetization of both the male and female ends permits a strong and instant connection while facilitating the flow of fluids, including, but not limited to, liquid and/or gases.

Additionally, an optional measure may create a secondary bond at the connector, if desired, where the optional measure can include, but is not limited to, the male/female coupling alloy itself be magnetized as either a primary or additional means of connection surety.

While the hose, tube, cable, duct, pipe, chain, strap, wire, twine, cord, rope or like connector may be in adapter form for use with existing hoses, tubes, cables, ducts, pipes, chains, straps, wires, twines, cords and/or ropes it may also be integrated into the manufacturing of hoses, tubes, cables, ducts, pipes, chains, straps, wires, twines, cords, ropes, or the like for a seamless use.

Some implementations can include dimensions that permit use with a variety of standardized hoses (e.g., garden hoses), including, but not limited to ½", ¾" and ⅝" diameters.

Furthermore, implementations may be scaled up or down to accommodate a multitude of uses, for, but not limited to; gardening, cooking, irrigation, crafts, medical, farming, agricultural, fishing, firefighting, nautical, construction and automotive.

An advantage of the disclosed subject matter is that the ease of connection and disconnection allows those with limited dexterity, or hand strength, with or without gloves the ability to perform and complete tasks from the mundane and everyday, to urgent and emergency needs.

In emergency or urgent situations, such as medical, fishing, firefighting, nautical, construction, agricultural, etc., the quick release provides a connection and disconnection solution where seconds matter.

This provides a speedy, effective, frustration and delay free, consistent means of connecting and disconnecting one hose, tube, cable, duct, pipe, chain, strap, wire, twine, cord, rope, and the like to another.

Unavailable in conventional art, magnetic elements in the male and female connectors create a fluid-tight and a slide together connection that virtually anyone can use.

Additionally, the single twist release makes disconnecting hose lengths possible and virtually effortless regardless of age, gender, dexterity, and/or hand strength; whether or not gloves are being worn.

The additional measures of surety (e.g., additional magnets or a latch) give the option of an even stronger connection if desired.

Some implementations can provide a simpler way to connect hoses, tubes, cables, ducts, pipes, chains, straps, wires, twines, cords, ropes and the like for certain individuals including, but not limited to, those with limited dexterity and hand strength or other disabilities, or who want to save time, energy and manpower for the task at hand allowing for the connection and/or disconnection effortlessly and immediately, without strain or delay. Therein becoming a critical time-saver, money-saver, stress reducer, mood-booster, and ally in and around areas including, but not limited to, the garden, kitchen, hospital, lab, field, shop, fire scene, rescue operation, or other areas where including, but not limited to hoses, tubes, cables, ducts, pipes, chains, straps, wires, twines, cords and/or ropes are used.

Although the disclosed subject matter has been described in the context of a single implementation, the features and functions described may also be implemented in other implementations.

DETAILED DESCRIPTION OF THE DRAWINGS

As used herein, the term "hose connector" can refer to any physical object that may have the characteristics of coupling, in any desired combination, one end of a hose, tube, cable, duct, pipe, chain, strap, wire, twine, cord and/or rope to another, through a magnetic connection, commonly, but not exclusively, released with a twisting motion, that may be additionally secured with a catch, latch, or other secondary measure, facilitating the secure fluid-tight connection and/or increasing of hose, tube, cable, duct, pipe, chain, strap, wire, twine, cord, rope lengths and the like.

Figure 1:
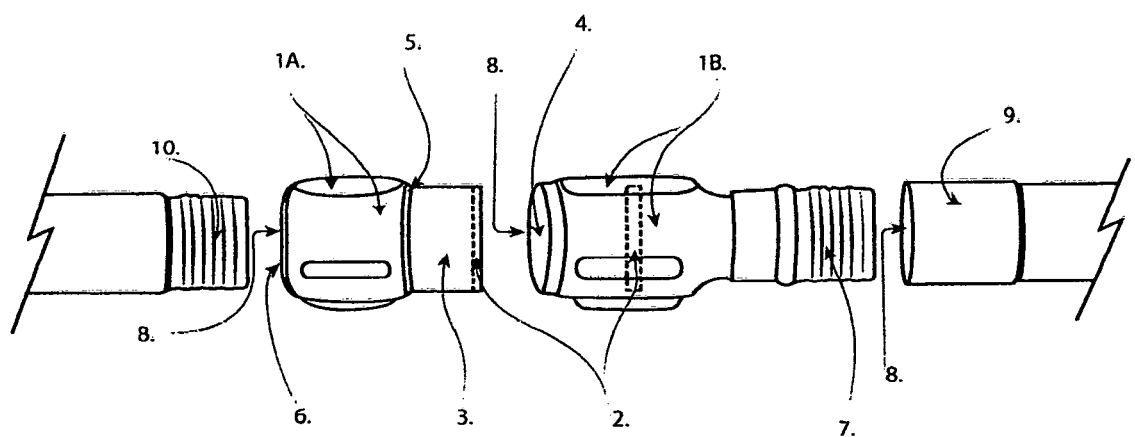
FIG. 1 is a perspective view of example magnetized connector pieces ready to connect in accordance with some implementations.

Referring now to the figures, more particularly to FIG. 1, which shows a perspective view of an example hose connector in which the magnetized male connector piece 1A is adjacent to the magnetic female connector piece 1B, illustrating the insertion position of the male into the female for the primary connection (or bond) and fluid flow 8.

The male connector piece 1A includes a magnet 2 (e.g., an annular magnet) disposed at a distal end of a male magnetic connector end 3. The annular magnet 2 can be encased in a protective coating and embedded or otherwise attached in rubber and/or housings of plastic, alloy, or other suitable material. The male connector piece 1A also includes an optional gasket 5. The male connector piece 1A can also include a comfortable grip on an exterior of the male connector piece 1A. The male magnetic connector end 3 has an outer diameter.

The female connector piece 1B includes a female magnetic connector end 4 and an annular magnet 2 disposed at a position offset (or inset) from the female magnetic connector end 4. The male and female connector pieces (1A and 1B) each include a fluid flow aperture 8. The female magnetic connector end 4 has an inner diameter that is larger than the outer diameter of the male magnetic connector end 3 to permit the male magnetic connector end 3 to fit into the female magnetic connector end 4 such that the annular magnets abut when the two ends (3 and 4) are connected.

The non-connector end of the female 1B connector piece has a threaded male connector end 7 to connect with the traditional female threaded receptor 9 on a standard hose end.

The non-connector end of the male 1A connector piece has an internal female threaded receptor 6 to receive the traditional threaded male hose end 10.

Additionally, and importantly, the male 1A and female 1B connector pieces are embedded or otherwise attached or married with magnets 2, facilitating a firm and fluid-tight bond, that may be further sealed by an external gasket 5 included on the neck of the male 1A connector.

The standard (e.g., common garden hose) female 9 and male 10 hose ends are shown for illustration and demonstration of attachment of the hose connector pieces 1A-1B to existing threaded hose ends via their female threaded adapter receptor 6 and male threaded adapter insert 7. Other types of connections can be used in place of the female and male threaded connectors (6 and 7).

Figure 2:
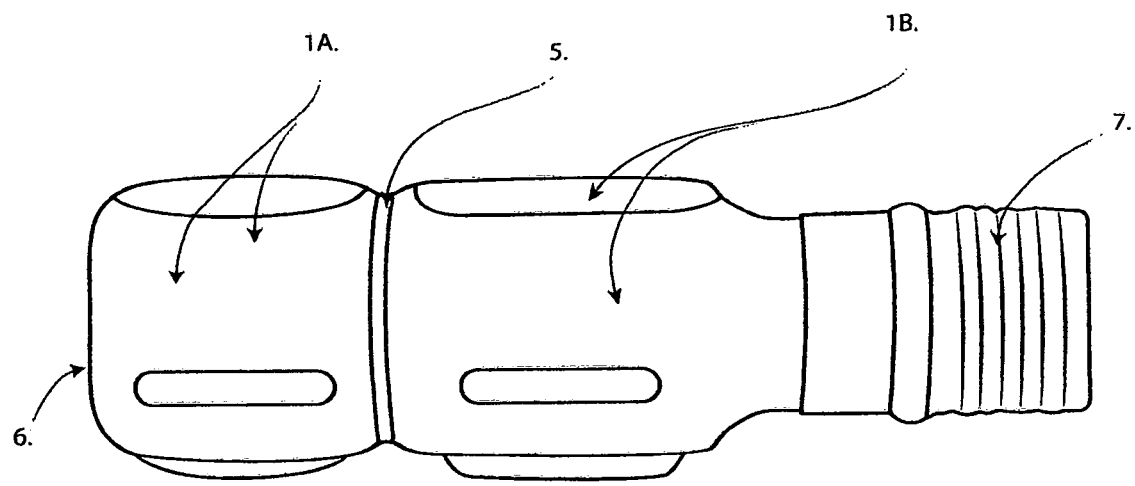
FIG. 2 is a perspective view of example magnetized connector pieces connected (or slid) together in accordance with some implementations.

FIG. 2 is a perspective view of the male 1A and female 1B connector pieces connected together and held in place via magnetic attraction provided by the annular magnets 2.

Figure 3:
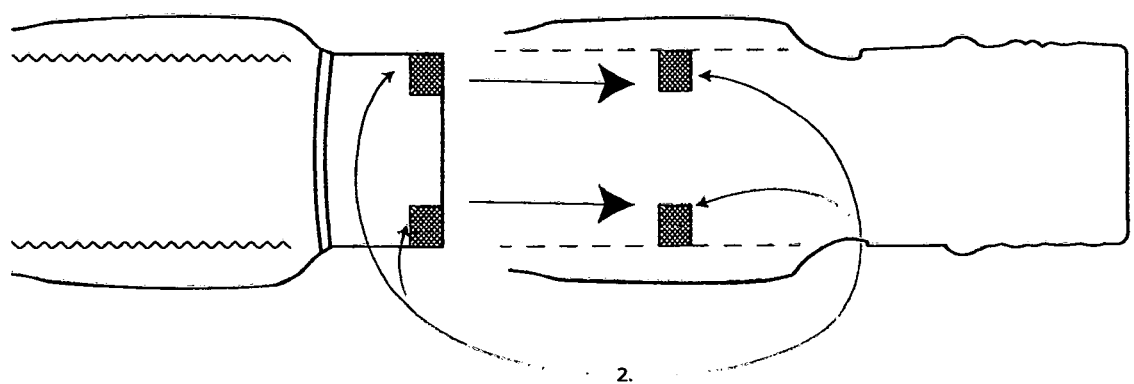
FIG. 3 is a lengthwise section view of example magnetic male and female connector pieces in accordance with some implementations.

FIG. 3 is a lengthwise section view of the male 1A and female 1B connector pieces in which the disclosed subject matter is shown. In this implementation, the easy grip housing 1A-1B surrounding the embedded (or otherwise secured, attached, or married) magnets 2 through which fluid, including, but not limited to, nor requiring liquid, gas, or other substances, flow 8 while connected, is illustrated.

Figure 4:
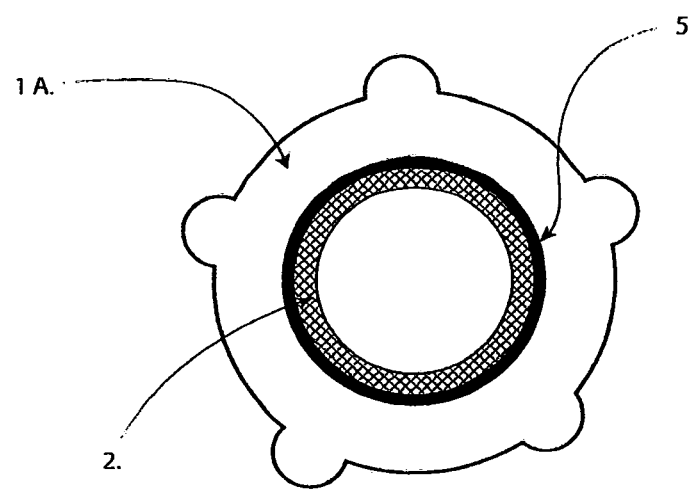
FIG. 4 is a cross-section view of an example magnetic male connector piece in accordance with some implementations.

FIG. 4 is a cross-section view of the male 1A easy grip housing connection piece in which the disclosed subject matter is shown. In this implementation, the easy grip housing 1A surrounding the annular magnet 2 through which fluid, including, but not limited to, nor requiring, liquid, gas, or other substances, flow 8, while connected, is shown with a gasket 5 around the inner opening.

Figure 5:
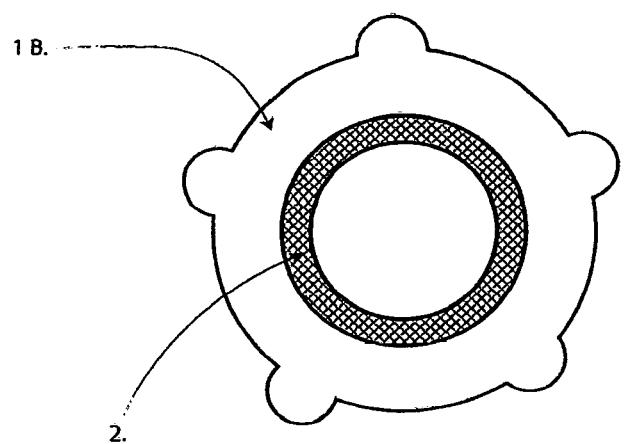
FIG. 5 is a cross-section view of an example magnetic female connector piece in accordance with some implementations.

FIG. 5 is a cross-section view of the female 1B easy grip housing connection piece in which the disclosed subject matter is shown. In this embodiment of the disclosed subject matter, the easy grip housing 1B surrounding the annular magnet 2 through fluid, including, but not limited to or requiring, liquid, gas, or other substances, flow 8, while connected.

Figure 6:
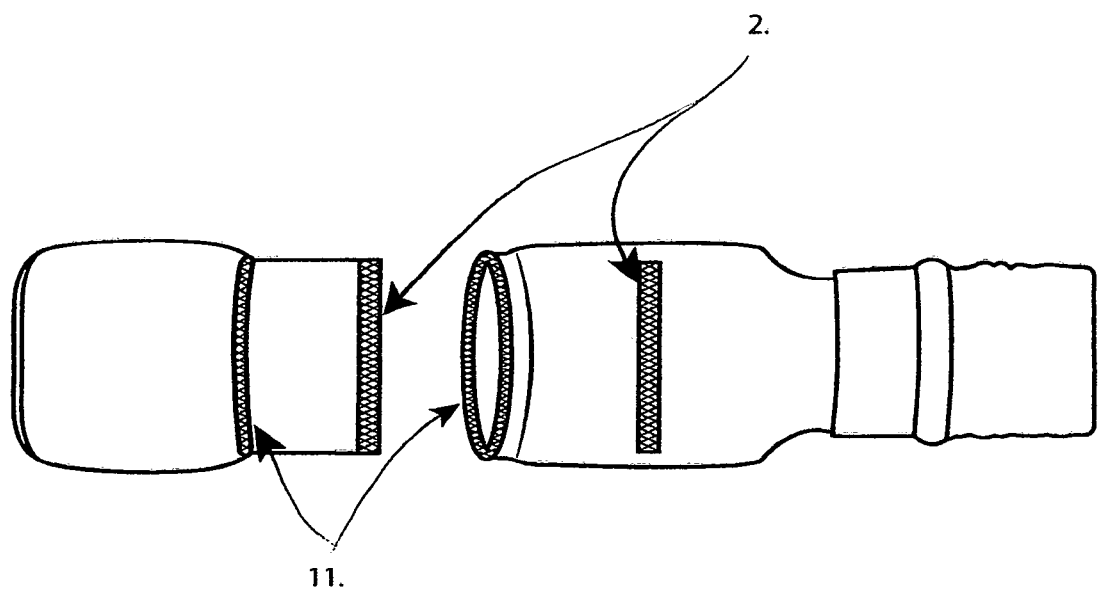
FIG. 6 shows a perspective view of an example hose connector in which the magnetic male and female connector pieces include additional annular magnets in accordance with some implementations.

FIG. 6 is a perspective view of an example hose connector having a first set of annular magnets 2 and an additional set of annular magnets 11 to provide additional connection force to the hose connector. The additional annular magnets 11 may be considered primary or secondary, may be embedded or otherwise attached, married, or connected. In some implementations, the annular magnets (2 and/or 11) may not be embedded or attached, but rather the magnetization may be intrinsic in the connection pieces themselves (e.g., portions of the connection pieces may be magnetized to provide the function of annular magnets, as well as electromagnetic methods to create the proper poling for connection). Some implementations can include only one set of annular magnets (e.g., either 2 or 11), while some implementations can include both sets of annular magnets (e.g., 2 and 11).

Figure 7:
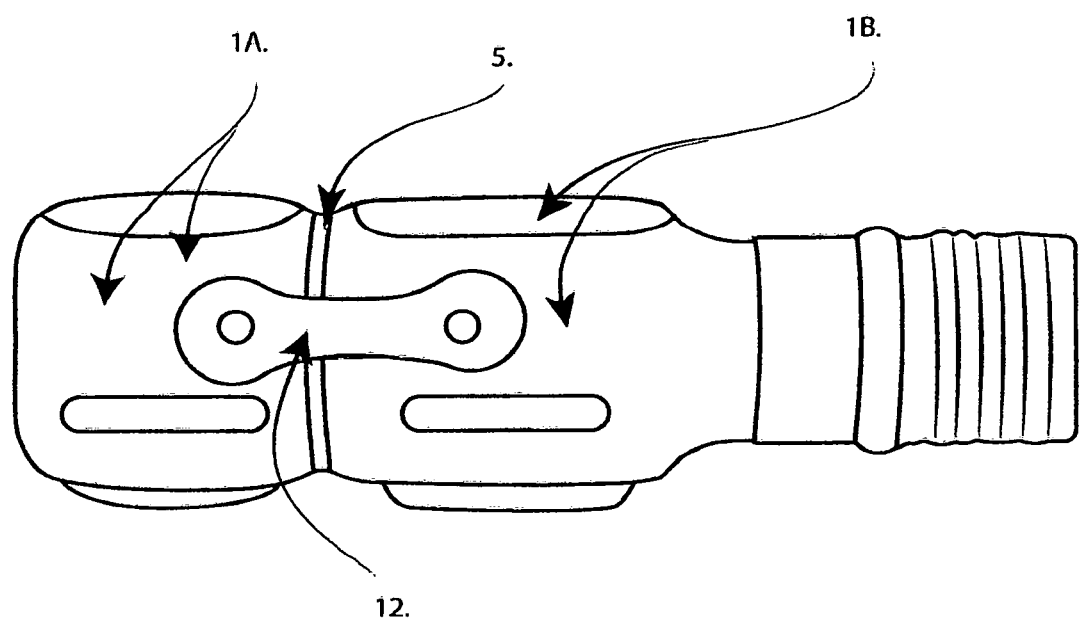
FIG. 7 shows a perspective view illustrating an example hose connector having additional attachment strap in accordance with some implementations.

FIG. 7 shows an example hose connector having an optional attachment strap 12 to help keep the male and female connection pieces joined and/or resistant to inadvertent twisting. The strap may be mechanical (e.g., snaps or latches, etc.) or may be magnetic (e.g., connecting to magnetic elements on the exterior of the male and female connection pieces). Other types of connections may be used including, but not limited to, snapping, magnetization, slotting, sliding or otherwise connecting for additional bond and security.

Figure 8:
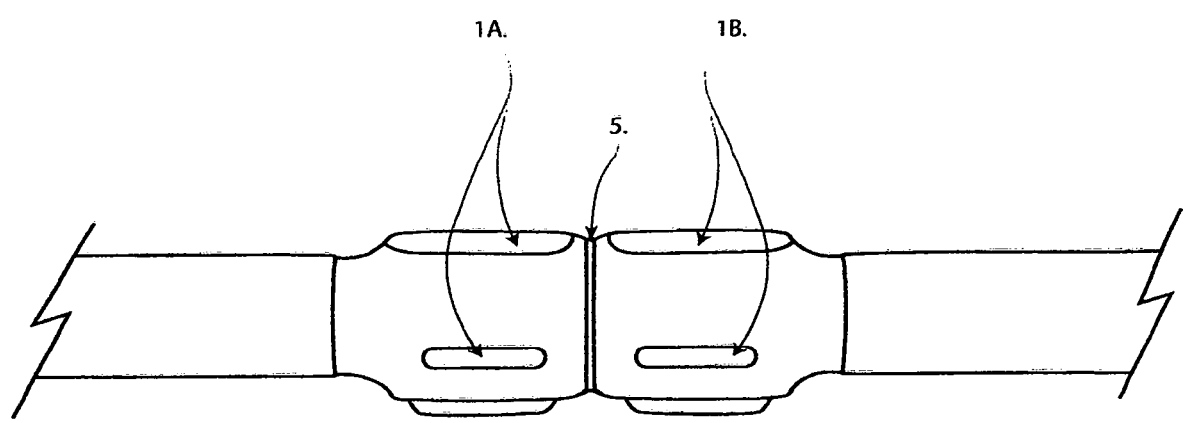
FIG. 8 shows an example connector in which the magnetic connector pieces are integrated into including, but not limited to hose, tube, cable, duct, pipe, chain, strap, wire, twine, cord, and/or rope ends in accordance with some implementations.

FIG. 8 shows an example hose connector that is integrated into any combination including, but not limited to the hose, tube, cable, duct, pipe, chain, strap, wire, twine, cord and/or rope ends providing a streamlined use with no adapters in between.

Disclosed is an improved hose connector wherein the male and female connector pieces are magnetic creating a slide in bond that requires no notable grip strength.

Disclosed is an improved hose connector wherein the single twist release requires minimal grip strength.

Disclosed is an improved hose connector wherein the rubber or other housing gives additional grip comfort and traction.

Disclosed is an improved hose connector wherein the magnetic male connector piece may have a gasket at the base of the neck facilitating an additional layer to fluid-tight, leak proof use.

Disclosed is an improved hose connector wherein the connector pieces may function as an adapter utilizing but not limited to existing hoses, tubes, cables, ducts, pipes, chains, strap, wire, twines, cords and/or ropes standard in the marketplace and multiple categories, including, but not limited to, gardening, cooking, crafts, jewelry making, medical, farming, agricultural, firefighting, construction, organizational, automotive, etc.

Disclosed is an improved hose connector wherein the design and use may be integrated into the manufacturing of existing hoses, tubes, cables, ducts, pipes, chains, straps, wires, twines, cords, ropes, and the like eliminating the need for an adapter and creating a streamlined connection system in multiple categories, including, but not limited to, gardening, cooking, crafts, jewelry making, medical, farming, agricultural, firefighting, construction, organizational, automotive, etc.

Disclosed is a method of inserting and connecting hoses, providing a means to connect hose, tube, duct, twine, cord and/or rope ends, for, including, but not limited to, homeowners, tenants, hobbyists, professionals, public servants, contractors, technicians, tradesman, landscapers, mechanics, doctors, nurses, cooks, housekeepers, as well as those with either limited grip strength and/or diminished ability or dexterity.

Disclosed is a method of inserting and connecting hoses, providing a way to extend the reach and use of hoses, tubes, cables, ducts, pipes, chains, straps, wires, twines, cords, and/or ropes and the movement of fluid, including, but not limited to or required, or other substances from one area of use to another.

Some implementations can include a system of inserting and connecting hoses through magnetization providing a strong connection of hose lengths with minimal exertion.

Some implementations can include a system of twisting and releasing hoses or the like through magnetization providing a low effort solution to disconnecting hose lengths.

Some implementations may be primary, secondary, or otherwise providing durability of connection and strength of bond through additional magnetization, embedded, or otherwise attached or married to the hose connector.

Some implementations may be a connection of a combination of but not limited to hose, tube, cables, ducts, pipes, chains, straps, wires, twine, cord, and/or rope.

Some implementations may not have a flow of fluid, but, rather a flow of electrical current, where the connection means would require twisting to release rather than conventional systems of connecting wires using magnets that release without twisting.

Some implementations may be connectors of solid materials, as with twine, cord, rope, etc. In such implementations, the magnetic members or elements may be annular, solid round (e.g., disc), or may be other shapes suited to the type of material (e.g., twine, cord, rope, etc. being connected). In some implementations, a magnetic twisting connection is applied to other than those requiring a "fluid-tight" seal and a female/male type coupler would not be needed. For example, when attaching two rope ends together, or a duct, connection may be made by touching the ends together and then twisting to release (e.g., no insertion associated with male/female type connectors).

Any combination of "ends" can be attached and released with or without a housing. A male/female coupling system is optional.

In some implementations, a cable may need to attach to an electronic device, a leash strap may need to attach to a collar, a rope may need to attach to a sail, a chain may need to attach to a pendant or a cable may need to attach to an anchor. Including but not limited to such cases, one magnet would be (embedded) in the cable, strap, rope, chain, etc., and the second magnet would be embedded in the device or other object, which would not have a second cable (or tube, rope, duct, etc.) end. It would only have the second magnet.

In some implementations including, but not limited to, an identification tag or device may need to be attached directly to a collar, a locket may need to be attached to a pendant, a sail may need to be attached directly to a mast.

The magnets may simply be one end (as defined) to any other object; magnet-to-magnet, and any variation in between. The magnets are not required to be housed in any particular way.

Some implementations may connect any combination of but not limited to hose, tubes, cables, ducts, pipes, chains, straps, wires, twine, cord, and/or rope ends, etc.

Disclosed is a variation that may be secondary or otherwise providing durability of connection and strength of bond through external strap or straps with fasteners that may include, but are not limited to, snaps, hooks, slides, magnets, or the like, to connect and may be embedded or otherwise attached or married to the hose connector.

Disclosed is a variation that may be primary, secondary, or otherwise providing durability of connection and strength of bond through the placement of a magnet near the external male housing gasket and the lip (e.g., at a distal end) of the female housing, creating a fluid-tight bond and secure connection. (see, e.g., FIG. 6, Item 11)

Disclosed is a variation that may be primary, secondary, or otherwise providing durability of connection and strength of bond through the magnetization of the male and/or female coupling pieces themselves, creating an intrinsic bond and secure connection.

Another implementation can include a magnetic connector adapter configured to be threaded onto a spout, hose bib, hydrant, or other valve to provide the ability for a hose with a magnetic connector to be connected to the spout, or other. The magnetic connector spout, hose bib, hydrant, or other valve adapter would be similar to 1A in that it would include a female threaded end to thread onto a male threaded spout and a male magnetic connection end to connect to a hose having a female magnetic connection end. The spout adapter could also include an additional magnet and/or a latch as described above.

It is contemplated that any optional feature described may be set forth and claimed independently, or in combination with any one or more of the features described herein. Reference to a singular item, includes the possibility that there is a plurality of the same items present. More specifically, as used herein and in the appended claims, the singular forms "a," "an," "said," and "the" include plural referents unless specifically stated otherwise. In other words, use of the articles allow for "at least one" of the subject item in the description above as well as the to be appended claims. It is further noted that the to be appended claims may be drafted to exclude any optional element. As such, this statement is intended to serve as antecedent basis for use of such exclusive terminology as "solely," "only" and the like in connection with the recitation of claim elements or use of a "negative" limitation.

Without the use of such exclusive terminology, the term "comprising" in the to be appended claims shall allow for the inclusion of any additional element irrespective of whether a given number of elements are enumerated in the to be appended claim, or the addition of a feature could be regarded as transforming the nature of an element set forth in the to be appended claims. Except as specifically defined herein, all technical and scientific terms used herein are to be given as broad a commonly understood meaning as possible while maintaining to be appended claim validity.

The breadth of the present disclosure is not to be limited to the examples provided. Rather it should be recognized that the disclosed subject matter includes the many variations explicitly or implicitly described herein, including those variations that would be obvious to one of ordinary skill in the art upon reading the present specification. Further, it is not intended that any section of this specification (e.g., the Summary, Detailed Description, Abstract, Field, etc.) be accorded special significance in describing the disclosed subject matter relative to another or the claims. All references cited are incorporated by reference in their entirety. Although the foregoing description has been set forth in detail for purposes of clarity of understanding, it is contemplated that certain modifications may be practiced within the scope of the disclosed subject matter.

What is claimed is:

1. A magnetic connector system comprising:
    a male connector piece having a male magnetic connector end, wherein the male magnetic connector end has an outer diameter and includes a first annular magnet disposed at a longitudinally outermost end of the male connector piece;
    a female connector piece having a female magnetic connector end, wherein the female magnetic connector end has an inner diameter and includes a second annular magnet longitudinally offset from an outmost end of the female connector piece and contained within the female connector piece, wherein the inner diameter of the female magnetic connector end is greater than the outer diameter of the male magnetic connector end, and wherein an outer diameter of the second annular magnet is less than the inner diameter of the female magnetic connector and a portion of the second annular magnet has a diameter equal to or less than the outer diameter of the male magnetic member to form a stop that abuts the first annular magnet when the male magnetic connector end is inserted into the female magnetic connector end and provides a magnet to magnet attraction to help keep the male connector piece joined to the female connector piece;
    a first additional annular magnet disposed on a neck of the male magnetic connector end of the male connector piece; and
    a second additional annular magnet disposed at a distal end of the female magnetic connector end of the female connector piece, wherein the first additional annular magnet and the second additional annular magnet provide an additional connection force to the magnetic connector system.

2. The magnetic connector system of claim 1, further comprising an external gasket disposed on a neck of the male magnetic connector end of the male connector piece.

3. The magnetic connector system of claim 1, further comprising attachment strap to secure the male connector piece to the female connector piece, wherein the attachment strap is disposed on an exterior of the magnetic connector system.

4. The magnetic connector system of claim 3, wherein the attachment strap includes a magnetic latching mechanism.

5. The magnetic connector system of claim 3, wherein the attachment strap includes a mechanical latching mechanism.

6. The magnetic connector system of claim 1, wherein the magnetic connector system is configured to connect one or more of a hose, a tube, a cable, a duct, a pipe, twine, a cord, or a rope.

7. A hose comprising:
    a first end and a second end, wherein the first end and the second end are connected by a length of hose or tube;
    a first additional annular magnet disposed on a neck of the male magnetic connector end of the male connector piece; and
    a second additional annular magnet disposed at a distal end of the female magnetic connector end of the female connector piece,
    wherein the first additional annular magnet and the second additional annular magnet provide an additional connection force,
    wherein the first end and the second end are each one of a male connector piece or a female connector piece, wherein the male connector piece includes a male magnetic connector end, wherein the male magnetic connector end has an outer diameter and includes a first annular magnet disposed at a longitudinally outermost end of the male connector piece, wherein the female connector piece includes a female magnetic connector end, wherein the female magnetic connector end has an inner diameter and includes a second annular magnet longitudinally offset from an outmost end of the female connector piece and contained within the female connector piece, wherein the inner diameter of the female magnetic connector end is greater than the outer diameter of the male magnetic connector end.

8. The hose of claim 7, further comprising an external gasket disposed on a neck of the male magnetic connector end of the male connector piece.

9. The hose of claim 7, further comprising an attachment strap disposed on the male connector piece or the female connector piece, wherein the attachment strap is disposed on an exterior of the first end and the second end.

10. The hose of claim 9, wherein the attachment strap includes a magnetic latching mechanism.

11. The hose of claim 9, wherein the attachment strap includes a mechanical latching mechanism.

12. A magnetic hose connector spout adapter comprising: having a male magnetic connector end and a female threaded connector end, wherein the male magnetic connector end includes a first annular magnet disposed at a longitudinally outermost end of the male magnetic connector and having a first diameter; and a first additional annular magnet disposed on a neck of the male magnetic connector end wherein the first additional annular magnet is configured to provide an additional connection force.

13. The magnetic hose connector spout adapter of claim 12, further comprising an external gasket disposed on a neck of the male magnetic connector end.

14. The magnetic hose connector spout adapter of claim 12, further comprising an attachment strap.

15. The magnetic hose connector spout adapter of claim 14, wherein the attachment strap includes a magnetic latching mechanism.

16. The magnetic hose connector spout adapter of claim 14, wherein the attachment strap includes a mechanical latching mechanism.

* * * * *